US008513964B2

(12) United States Patent
Yue et al.

(10) Patent No.: US 8,513,964 B2
(45) Date of Patent: Aug. 20, 2013

(54) CIRCUIT INTERRUPTER DEVICE WITH SELF-TEST FUNCTION

(75) Inventors: Guo-Ian Yue, Shanghai (CN); Cheng-li Li, Shanghai (CN)

(73) Assignee: Shanghai ELE Manufacturing Corp., Shanghai (CN)

(*) Notice: Subject to any disclaimer, the term of this patent is extended or adjusted under 35 U.S.C. 154(b) by 336 days.

(21) Appl. No.: 12/942,948

(22) Filed: Nov. 9, 2010

(65) Prior Publication Data

US 2012/0007621 A1    Jan. 12, 2012

(51) Int. Cl.
*G01R 31/3187* (2006.01)
*H02H 9/08* (2006.01)

(52) U.S. Cl.
USPC ........... 324/750.3; 324/510; 324/130; 361/42

(58) Field of Classification Search
None
See application file for complete search history.

(56) References Cited

U.S. PATENT DOCUMENTS

| 6,522,510 | B1* | 2/2003 | Finlay et al. .................. 361/42 |
| 6,807,036 | B2* | 10/2004 | Baldwin ......................... 361/42 |
| 6,980,005 | B2* | 12/2005 | Finlay et al. .................. 324/424 |
| 7,443,309 | B2 | 10/2008 | Baldwin et al. |
| 2007/0195470 | A1 | 8/2007 | Zhang et al. |
| 2009/0251148 | A1 | 10/2009 | Finlay, Sr. et al. |

FOREIGN PATENT DOCUMENTS

| CN | 1815663 | 8/2006 |
| CN | 1835316 A | 9/2006 |

* cited by examiner

Primary Examiner — Minh N Tang
(74) Attorney, Agent, or Firm — Chen Yoshimura LLP

(57) ABSTRACT

A ground fault circuit interrupter (GFCI) device with self-test function includes: hot and neutral conducting circuits; an fault detection circuit responsive to a fault in the hot and neutral conducting circuits to generate a fault detection signal; a signal driving circuit responsive to the fault detection signal to generate a drive signal; a disconnecting mechanism for disconnecting electrical connections in the hot and the neutral conducting circuits when the drive signal exceeds a predetermined level; a self-test circuit for generating a self-test signal according to a predetermined time period and when an alternating current of the power source passes zero points, generating an evaluation result based on the self-test signal and a feedback signal of a fault detection signal corresponding to the self-test signal, and generating error signals if the evaluation result indicates a circuit error; and a device-state indicator circuit for generating alarms based on the error signals.

9 Claims, 4 Drawing Sheets

CIRCUIT INTERRUPTER DEVICE WITH SELF-TEST FUNCTION

BACKGROUND OF THE INVENTION

1. Field of the Invention

This invention relates to an electrical circuit protection device, and in particular, it relates to a ground-fault circuit interrupter (GFCI) device for disconnecting an input side and an output side of an electrical circuit.

2. Description of the Related Art

To prevent harm caused by leakage current in home appliances, such as water heaters and refrigerators, it is common to use a ground-fault circuit interrupter (GFCI) device for the power input of the appliances, such as by employing a power receptacle having a leakage current protection function.

Currently, most GFCI devices have leakage current protection functions, but require manual testing (e.g. a user manually depressing a test button) to test whether the protection function of device is working properly. If the user does not periodically test the device manually, and the GFCI device malfunctions due to internal problems and fails to disconnect the input and output sides, accidents such as electric shock or fire may occur.

Some GFCI devices have a self-test function to detect whether the protection function of the device is working properly. Such a device periodically outputs a self-test signal to generate a simulated ground fault current on the hot conductor of the device. The device detects whether a self-test feedback signal is generated in order to determine whether the protection function is working properly.

For example, in China patent application CN 200510083979.4, a self-test signal is generated near the 140 to 150-degree position of the sine wave (i.e. in the dropping part of the positive half-cycle) of the power source. Because the anode and cathode of the silicon-controlled rectifier (SCR) will automatically become non-conducting when the power source signal passes zero points, this self-test method may adversely affect the normal detection of ground faults, and may cause the GFCI device to trip erroneously.

In other examples, such as U.S. Pat. No. 7,443,309, U.S. Pat. Appl. Pub. No. 20090251148, and China patent application CN 200610007854.8, the SCR of the GFCI is conductive during the positive half-cycle of the power source, and the device uses the negative half-cycle of the power source to generate self-test signals to perform self-test. This method does not cause erroneous tripping; however, if a ground fault occurs during the self-test period, the simulated ground fault current caused by the self-test signal is superimposed on the true ground fault current, adversely affecting the detection of the ground fault current in the negative half-cycle. Further, because the SCR is not conductive in the negative half-cycle, the reaction time of the GFCI device is increased for those ground fault conditions that start in the negative half-cycle of the power source.

SUMMARY OF THE INVENTION

Accordingly, the present invention is directed to a GFCI device that substantially obviates one or more of the problems due to limitations and disadvantages of the related art.

An object of the present invention is to provide a GFCI device that has a self-test function but does not adversely affect its normal ground fault protection function.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a ground fault circuit interrupter (GFCI) device comprising: a hot conducting circuit and a neutral conducting circuit for connecting to a power source; an fault detection circuit, coupled to the hot conducting circuit and the neutral conducting circuit, being responsive to at least a fault in the hot conducting circuit and the neutral conducting circuit to generate a first fault detection signal; a signal driving circuit, coupled to the fault detection circuit, being responsive to the first fault detection signal to generate a drive signal; a disconnecting mechanism, coupled to the signal driving circuit, for disconnecting an electrical connection in the hot conducting circuit and the neutral conducting circuit when the drive signal exceeds a predetermined level; a self-test circuit, coupled to the fault detection circuit and the signal driving circuit, for generating a self-test signal according to a predetermined time period and when an alternating current of the power source passes zero points, generating an evaluation result based on the self-test signal and a feedback signal of a second fault detection signal corresponding to the self-test signal, and generating one or more error signals if the evaluation result indicates a circuit error; and a device-state indicator circuit, coupled to the self-test circuit, for generating one or more alarms based on the one or more error signals.

In one embodiment, the self-test circuit includes a zero-point sampling circuit, coupled to the hot conducting circuit and the neutral conducting circuit, for providing a zero-point sampling signal when the alternating current of the power source passes the zero points; and a self-test signal processing circuit, coupled to the zero-point sampling circuit and the fault detection circuit, for generating the self-test signal according to the predetermined time period and in response to the zero-point sampling signal, generating the evaluation result in response to the self-test signal and the feedback signal of the second fault detection signal corresponding to the self-test signal, and generating the one or more error signals based on the evaluation result that indicates the circuit error.

In one embodiment, the signal driving circuit includes a silicon-control rectifier (SCR), a control gate of the SCR being coupled to the fault detection circuit, the SCR being responsive to the fault detection signal to generate the drive signal.

In one embodiment, the self-test circuit further includes an SCR-state sampling circuit, coupled to the SCR and the self-test signal processing circuit, being responsive to the second fault detection signal corresponding to the self-test signal to generate the feedback signal applied to the self-test signal processing circuit.

In one embodiment, the SCR-state sampling circuit includes a coupling device, wherein a primary stage of the coupling device is coupled to the SCR and a secondary stage of the coupling device is coupled to the fault detection circuit and the self-test signal processing circuit, the coupling device being responsive to the fault detection signal corresponding to the self-test signal to generate the feedback signal applied to the self-test signal processing circuit.

In one embodiment, the primary stage of the coupler device is coupled via a resistive path to a DC bias of the signal driving circuit and an anode of the SCR respectively, wherein the resistive path restricts a current through the SCR to a value smaller than a maintenance current of the SCR, such that the SCR is non-conductive when the second fault detection signal corresponding to the self-test signal disappears.

In one embodiment, the fault detection circuit includes an inductor device, wherein a first primary winding of the inductor device is coupled to the hot conducting circuit and the neutral conducting circuit, the inductor device generating the first fault detection signal in response to a fault in the first primary winding, and wherein the inductor device includes a second primary winding coupled to the self-test signal processing circuit, the inductor device generating the second fault detection signal in response to the self-test signal, wherein the self-test signal is a high-frequency pulse signal.

In one embodiment, the second primary winding of the inductor device has multiple turns. As a result, the required magnitude of the self-test signal is reduce, thereby reducing power consumption of the circuit interrupter device.

In one embodiment, the GFCI device includes a whole-wave rectifier bridge, wherein the anode of the SCR is connected to the rectifier bridge to receive a DC bias voltage. As a result, the SCR can become conductive in both the positive half cycle and the negative half cycle of the AC current. Regardless of whether the ground fault occurs during the positive or negative half cycle of the AC current, the GFCI device can trip immediately, which reduces the average response time for a trip.

In one embodiment, the device-state indicator circuit includes a light-emitting diode or a beeper.

The GFCI device according to embodiments of the present invention has many advantages. It has a simple circuit structure, and can accurately determine whether the protection function of the GFCI is working properly without affecting the normal ground fault detection function of the device. When the GFCI loses its ground fault protection function, the device-state indicator circuit can clearly indicate this fact to the user, so that the user can replace the GFCI device in a timely manner, more effectively protecting the user and the electrical appliances.

It is to be understood that both the foregoing general description and the following detailed description are exemplary and explanatory and are intended to provide further explanation of the invention as claimed.

BRIEF DESCRIPTION OF THE DRAWINGS

In the above figures, the same or similar features in various embodiments are labeled with the same or similar reference symbols.

DETAILED DESCRIPTION OF THE PREFERRED EMBODIMENTS

Figure 1:
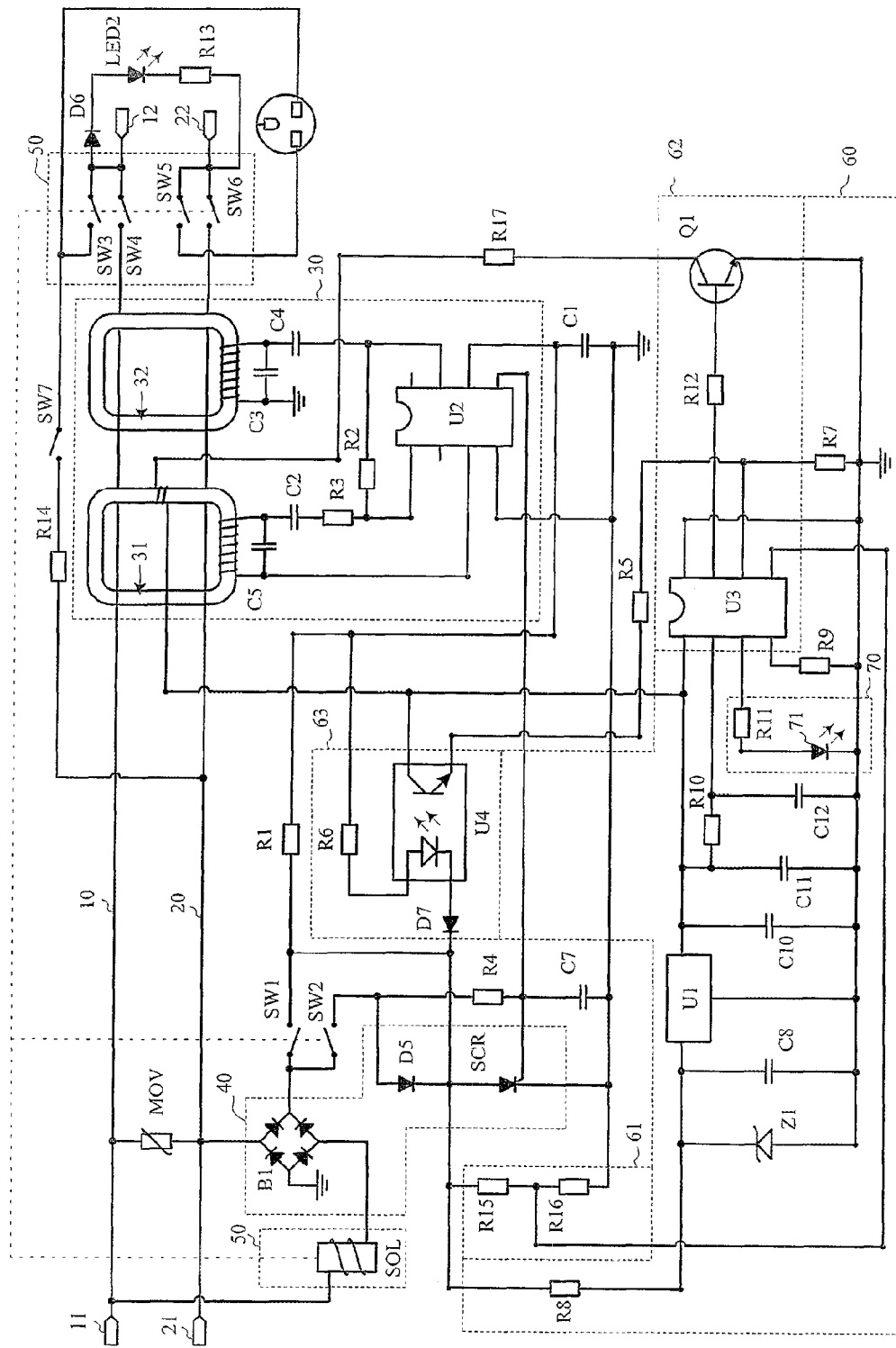
FIG. 1 is a circuit diagram showing a ground fault circuit interrupter (GFCI) device according to an embodiment of the present invention.

FIG. 1 is a circuit diagram showing a ground fault circuit interrupter (GFCI) device according to an embodiment of the present invention. As shown in FIG. 1, the GFCI device includes hot conducting circuit 10, neutral conducting circuit 20, fault detection circuit 30, signal driving circuit 40, disconnecting mechanism 50, self-test circuit 60, and device-state indicator circuit 70.

The hot conducting circuit 10 includes hot input terminal 11, hot output terminal 12, and switch SW4 connecting the hot input terminal to the hot output terminal. The neutral conducting circuit 20 includes neutral input terminal 21, neutral output terminal 22, and switch SW6 connecting the neutral input terminal to the neutral output terminal. Switch SW3 connects hot output terminal 12 to a receptacle output; switch SW5 connects neutral output terminal 22 to the receptacle output.

The fault detection circuit 30 is coupled to the hot conducting circuit 10 and neutral conducting circuit 20, and is responsive to at least a fault in the hot conducting circuit and neutral conducting circuit (ground fault) to generate a fault detection signal.

More specifically, the fault detection circuit 30 includes detector rings (inductors) 31 and 32 and a GFCI control IC U2. The detector rings 31 and 32 detect a current imbalance between the hot conducting circuit 10 and neutral conducting circuit 20 (which form the primary winding of the inductors). The detected current is amplified and further processed, and a fault detection signal is generated on a pin of the IC U2.

The signal driving circuit 40 is coupled to the fault detection circuit 30, and is responsive to the fault detection signal to generate a drive signal.

More specifically, the signal driving circuit 40 includes a whole-wave rectifier bridge B1 and a silicon-control rectifier (SCR) SCR. The cathode of the SCR is connected to ground, and the anode of the SCR is connected to the rectifier bridge B1 to receive a DC bias voltage. The control gate of the SCR is connected to the pin of the IC U2 that outputs the fault detection signal. When the fault detection signal triggers the SCR into a conductive state, a large current (i.e. the drive signal) flows through the SCR and the rectifier bridge B1.

The disconnecting mechanism 50 is coupled to the signal driving circuit 40, and operates to disconnect the electrical connection in the hot conducting circuit 10 and the neutral conducting circuit 20 when the drive signal exceeds a predetermined level.

More specifically, the disconnecting mechanism 50 includes a solenoid SOL and switches SW3, SW4, SW5, and SW6.

The circuit interrupter device may be in a tripped (i.e. disconnected) state or a reset (i.e. connected) state. In the tripped state, switches SW1 through SW6 are all open (disconnected). When a reset button is pressed down, mechanical parts such as a reset shaft coupled to the reset button cause switch SW2 to be closed (connected), whereby the SCR becomes conductive, and a large current flows through the solenoid SOL. The current causes a core of the solenoid to move and strike a lock member, such that the lock member is mechanically engaged (locked) to the reset shaft. When the reset button is subsequently released, the reset shaft moves in the reverse direction and brings the lock member with it; as a result, switches SW1, SW3, SW4, SW5 and SW6 are closed, and switch SW2 is open, whereby the circuit interrupter is in the reset state. In the reset state, when the SCR is triggered into the conductive state by the fault detection signal, a large current (i.e. the drive signal) flows through the solenoid SOL. When the drive signal exceeds the predetermined level, the core of the solenoid moves to strike the lock member. This causes the lock member and the reset shaft to disengage, and switches SW1, SW3, SW4, SW5 and SW6 become open, whereby the circuit interrupter goes into the tripped state.

Because the SCR is biased by a DC current, it can become conductive in both the positive half cycle and the negative half cycle of the AC current. Regardless of whether the ground fault occurs during the positive or negative half cycle of the AC current, the circuit interrupter device can trip immediately, which reduces the average response time for a trip.

The self-test circuit 60 is coupled to the fault detection circuit 30 and the signal driving circuit 40. It generates a self-test signal according to a predetermined time period and when the AC current passes the zero points, and generates an evaluation result in response to the self-test signal and a feedback of the fault detection signal corresponding to the self-test signal (for convenience, such a fault detection signal may be referred to as the second fault detection signal). If the evaluation result that indicates a circuit error, the self-test circuit 60 generates one or more error signals.

More specifically, the self-test circuit 60 includes a zero-point sampling circuit 61, self-test signal processing circuit 62, and an SCR-state sampling circuit 63.

The zero-point sampling circuit 61 includes resistors R15 and R16. The pulse signal obtained from this voltage divider, which is synchronized with the power source, provides a zero-point sampling signal for the self-test signal processing circuit 62.

Figure 3:
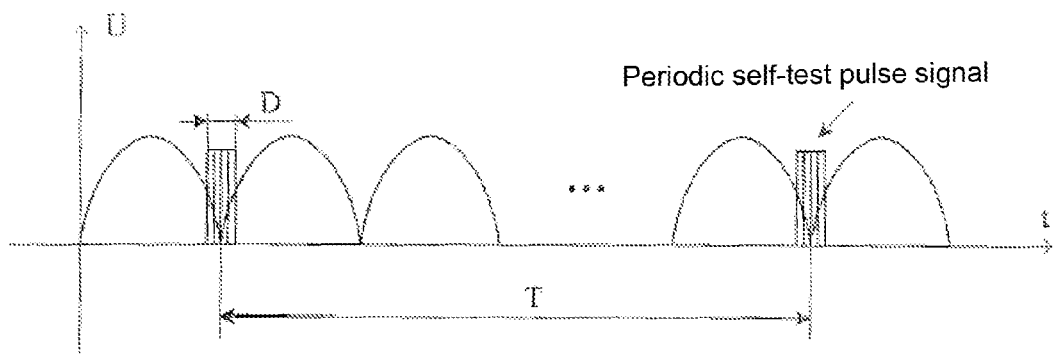
FIG. 3 illustrates the pulses of the power source and the self-test signal in an embodiment of the present invention.
Figure 4:
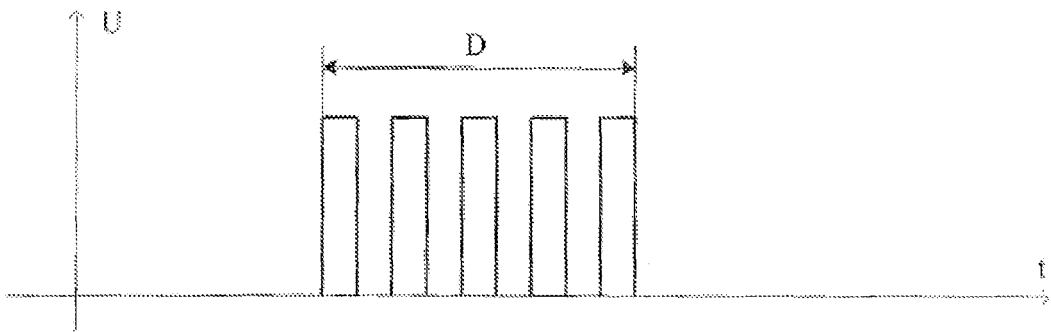
FIG. 4 illustrates the pulses of the self-test signal in an embodiment of the present invention.

The self-test signal processing circuit 62 includes a microprocessor IC U3 and transistor Q1. The DC bias voltage of the IC U3 is provided by a self-test power module, which includes resistor R8, zener diode Z1, regulator IC U1, and capacitors C8 and C10. Current is introduced from the anode of the SCR via resistor R8. IC U3 detects the zero points of the AC power source, and according to a predetermined period, outputs the self-test signal to the base of the transistor Q1 at a zero point. FIG. 3 illustrates the pulses of the power source and the self-test signal in this embodiment. As shown, the duration of each self-test signal is D, and is period of repetition is T. Typically, the frequency of the power source is 50 Hz or 60 Hz, so its period is approximately 20 ms. The duration D of the self-test signal may be (but is not limited to) 1 ms, and the period T is typically a multiple of the period of the power source, such as (but is not limited to) 1 minute. FIG. 4 illustrates the pulses of the self-test signal in this embodiment. As shown, the self-test signal is a high-frequency pulse signal. A second primary winding of the detector ring 31 is connected to the collector of the transistor Q1. The high-frequency self-test signal outputted by the IC U3 is amplified by the transistor Q1 and generates a change in the magnetic flux in the detector ring 31, which causes the fault detection circuit 30 to generate a fault detection signal (the second fault detection signal). The second primary winding may have multiple turns in order to reduce the required magnitude of the self-test signal, thereby reducing power consumption of the circuit interrupter device.

The SCR-state sampling circuit 63 is coupled to the SCR and the self-test signal processing circuit 62. It is responsive to the second fault detection signal corresponding to the self-test signal to generate a feedback signal applied to the self-test signal processing circuit 62.

More specifically, the SCR-state sampling circuit 63 includes a coupling device U4. The primary stage of the coupling device U4 is coupled to the SCR, and its secondary stage is coupled to the fault detection circuit 30 and the self-test signal processing circuit 62. The coupling device U4 is responsive to the second fault detection signal corresponding to the self-test signal to generate the feedback signal applied to the self-test signal processing circuit 62. The coupling device is typically a photo coupler device.

The primary stage of the coupler device U4 is coupled, via a resistive path (e.g. resistor R6 in the illustrated embodiment), to the DC bias of the signal driving circuit 40 and the anode of the SCR respectively. The resistive path is designed so that the current through the SCR is smaller than the maintenance current of the SCR.

The device-state indicator circuit 70 is coupled to the self-test circuit 60 and generates one or more alarms based on the one or more fault signals generated by the self-test circuit 60. In the illustrated embodiment, the device-state indicator circuit 70 includes a light-emitting diode 71. Those skilled in the art will recognize that the device-state indicator circuit 70 may also use various other acoustic, optical and electrical indicators such as beeper, liquid crystal display, etc.

Figure 5:
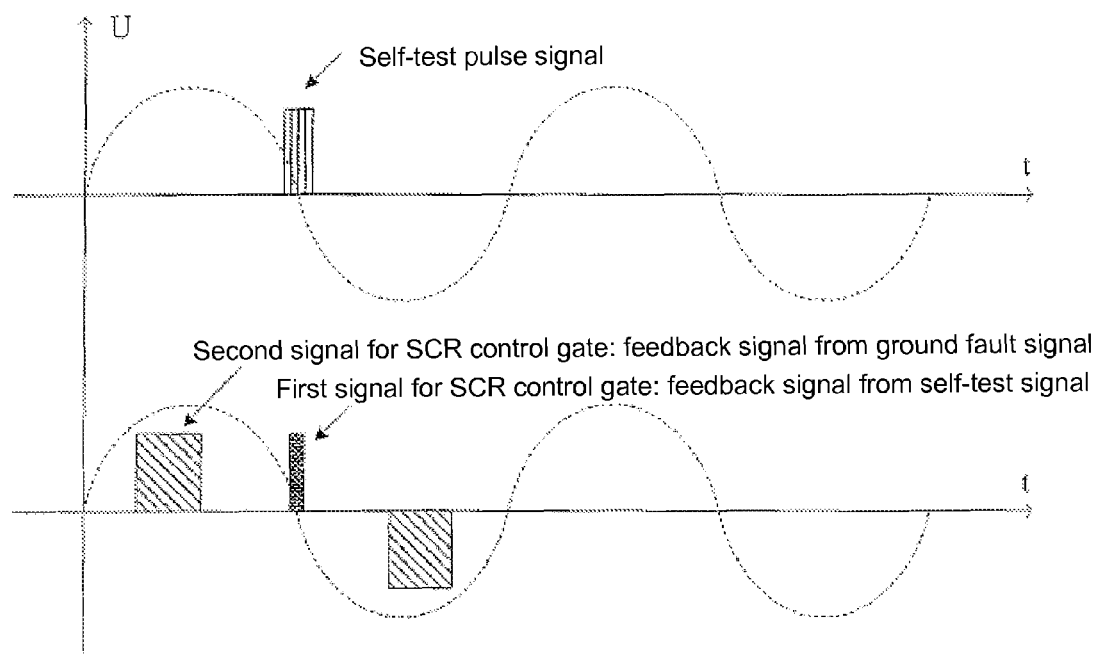
FIG. 5 illustrates the two types of trigger signal at the control gate of the SCR in an embodiment of the present invention.

When the circuit interrupter device is working properly, capacitor C1 is provided with a DC bias voltage, and the anode of the SCR is connected via switch SW1 to the DC pulse voltage which is synchronized with the AC voltage. The fault detection circuit 30 generates the second fault detection signal in response to the self-test signal, which causes the SCR to become conductive. This second fault detection signal lasts for approximately the same time as the duration D of the self-test signal, and is also located near the zero points of the AC voltage. Near the zero points of the AC voltage, the DC pulse signal at the anode of the SCR is in its valley, and the voltage at the negative end of the diode D7 is lower than the voltage at its positive end, so that a current flows from capacitor C1 via resistor R6, the primary stage of the coupling device U4, and diode D7 through the SCR. The resistance of the resistor R6 is designed so that this current is smaller than the maintenance current of the SCR. When the self-test signal disappears, the second fault detection signal corresponding to the self-test signal also disappears. The SCR is non-conducting because the current passing through it is less than the maintenance current of the SCR. As a result, the current flowing through the solenoid SOL is less than a predetermined value and is insufficient to move the core of the solenoid. Thus, the self-test signal will not cause the circuit interrupter device to trip erroneously. FIG. 5 illustrates the two types of trigger signal at the control gate of the SCR in this embodiment. As shown, the first type of trigger signal is a feedback of the self-test signal; it occurs at zero points of the AC current and its duration is approximately the same as the duration D of the self-test signal. The second type of trigger signal is a feedback of the true ground fault current, and its starting time and duration are unpredictable.

The various states and the changes between the states of the circuit interrupter device of this embodiment are as follows.

When the hot input terminal 11 and neutral input terminal 21 are initially connected to the power source, the circuit interrupter device is in a tripped state. The anode of the SCR does not have a DC bias voltage, and IC U3 does not have a power supplied to it. No self-test signal is generated, and the LED 71 is not illuminated.

When the reset button is pressed, the circuit interrupter device is in a reset state. IC U3 receives a power supply, and the self-test circuit 60 starts to function. In a normal working state, the LED 71 is illuminated.

The self-test signal processing circuit 62 detects the signal from the zero-point sampling circuit 61. If a sine wave signal is not present in this signal, then it means an error exists in the circuit, and the self-test signal processing circuit 62 generates a first error signal. The LED 71 generates a corresponding alarm. Possible causes of this type of error condition include: open circuit of the solenoid SOL, open circuit of the rectifier bridge B1, and error in the voltage divider R15, R16.

If a sine wave signal is present in the signal from the zero-point sampling circuit 61, then the self-test signal processing circuit 62 generates a high-frequency self-test pulse signal having a period T and duration D. The self-test signal processing circuit 62 detects whether the pin connected to the resistor R12 has the high-frequency self-test pulse signal. If not, the self-test signal processing circuit 62 generates a second error signal, and the LED 71 generates a corresponding alarm. Possible causes of this type of error condition include internal errors of the self-test signal processing circuit 62.

If a high-frequency self-test pulse signal is present at the pin connected to the resistor R12, its feedback signal is fed back to the self-test signal processing circuit 62 via the secondary stage of the coupling device U4 and the point between resistors R5 and R7. A normal feedback signal is a pulse signal having the same frequency and phase as the self-test signal.

If a feedback signal is not detected when the self-test pulse signal is high, then the self-test signal processing circuit 62 generates a third error signal, and the LED 71 generates a corresponding alarm. Possible causes of this type of error condition include errors in the fault detection circuit 30.

If a feedback signal is detected when the self-test pulse signal is low, it means that a ground fault is present during the duration of the self-test signal. The self-test signal processing circuit 62 will stop outputting the self-test signal and wait for a predetermined period of time, such as 5 seconds. Then, if the self-test signal processing circuit 62 can still detect a sine wave signal from the zero-point sampling circuit 61, the self-test signal processing circuit 62 generates a fourth error signal, and the LED 71 generates a corresponding alarm. Possible causes of this type of error condition include malfunction of the disconnecting mechanism 50 which prevents the circuit interrupter device going into the tripped state from the reset state.

Those skilled in the art will recognizes that the above four error signals and their corresponding alarms may be the same or different. For example, the four error signals may all be to stop the power supply to the device-state indicator circuit 70 so that the LED 71 is not illuminated. In another example, the four error signals are signals of different frequency, and the corresponding alarms are LED flashes of different frequencies.

Figure 2:
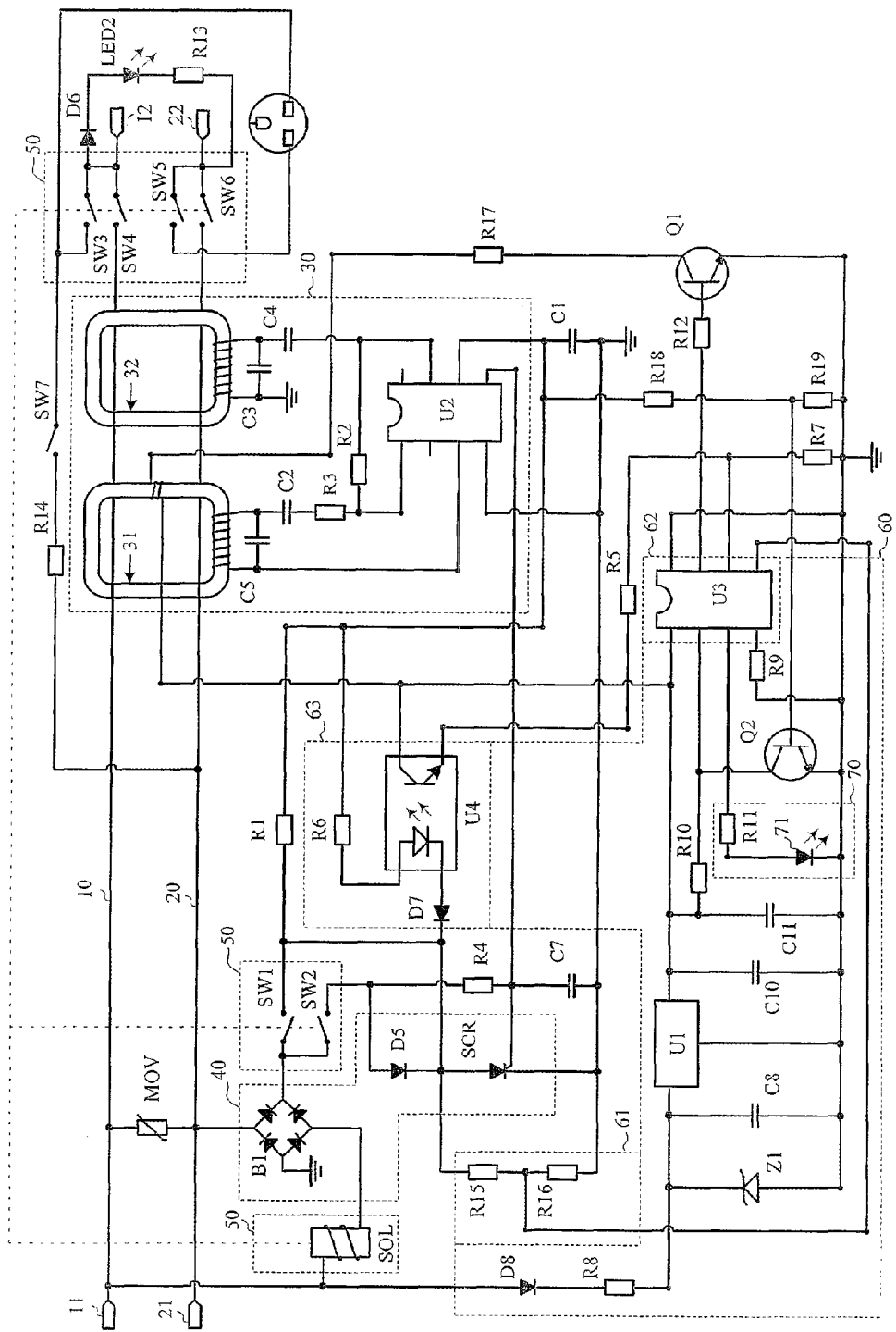
FIG. 2 is a circuit diagram showing a GFCI device according to another embodiment of the present invention.

FIG. 2 is a circuit diagram showing a circuit interrupter device according to another embodiment of the present invention. As shown in FIG. 2, this circuit interrupter device includes hot conducting circuit 10, neutral conducting circuit 20, fault detection circuit 30, signal driving circuit 40, disconnecting mechanism 50, self-test circuit 60, and device-state indicator circuit 70.

A main difference between the circuit of FIG. 2 and the circuit of FIG. 1 is in the self-test circuit 60.

In the second embodiment, the DC bias for the self-test signal processing circuit 62 (including the IC U3) is provided by a self-test power module, which includes diode D8, resistor R8, zener diode Z1, regulator IC U1, and capacitors C8 and C10. Power is introduced from the hot conducting circuit 10 via diode D8 and current-limiting resistor R8.

In addition, the self-test signal processing circuit 62 receives a trigger signal from the IC U2 of the fault detection circuit 30 via transistor Q2 and resistor R18.

The various states and the change between the states of the circuit interrupter device of the second embodiment are as follows.

When the hot input terminal 11 and neutral input terminal 21 are initially connected to the power source, the circuit interrupter device is in a tripped state. The self-test signal processing circuit 62 is supplied with power, but the fault detection circuit 30 has not yet started to function, transistor Q2 does not generate a trigger signal, and the self-test signal processing circuit 62 has not yet started the self-test function and does not output a self-test signal. Under normal working condition, the LED 71 is illuminated.

When the reset button is pressed, the circuit interrupter device is in a reset state. The fault detection circuit 30 starts to function, and a DC bias is applied to the anode of the SCR.

The self-test signal processing circuit 62 detects the signal from the zero-point sampling circuit 61. If a sine wave signal is not present in this signal, then it means an error exists in the circuit, and the self-test signal processing circuit 62 generates a first error signal. The LED 71 generates a corresponding alarm. Possible causes of this type of error condition include: open circuit of the solenoid SOL, open circuit of the rectifier bridge B1, and error in the voltage divider R15, R16.

If a sine wave signal is present in the signal from the zero-point sampling circuit 61, then the self-test signal processing circuit 62 generates a high-frequency self-test pulse signal having a period T and duration D. The self-test signal processing circuit 62 detects whether the pin connected to the resistor R12 has the high-frequency self-test pulse signal. If not, the self-test signal processing circuit 62 generates a second error signal, and the LED 71 generates a corresponding alarm. Possible causes of this type of error condition include internal errors of the self-test signal processing circuit 62.

If a high-frequency self-test pulse signal is present at the pin connected to the resistor R12, its feedback signal is fed back to the self-test signal processing circuit 62 via the secondary stage of the coupling device U4 and the point between resistors R5 and R7. A normal feedback signal is a pulse signal having the same frequency and phase as the self-test signal.

If a feedback signal is not detected when the self-test pulse signal is high, then the self-test signal processing circuit 62 generates a third error signal, and the LED 71 generates a corresponding alarm. Possible causes of this type of error condition include errors in the fault detection circuit 30.

If a feedback signal is detected when the self-test pulse signal is low, it means that a ground fault is present during the duration of the self-test signal. The self-test signal processing circuit 62 will stop outputting the self-test signal and wait for a predetermined period of time, such as 5 seconds. Then, if the self-test signal processing circuit 62 can still detect a sine wave signal from the zero-point sampling circuit 61, the self-test signal processing circuit 62 generates a fourth error signal, and the LED 71 generates a corresponding alarm. Possible causes of this type of error condition include malfunction of the disconnecting mechanism 50 which prevents the circuit interrupter device going into the tripped state from the reset state.

Those skilled in the art will recognizes that the above four error signals and their corresponding alarms may be the same or different. For example, the four error signals may all be to stop the power supply to the device-state indicator circuit 70 so that the LED 71 is not illuminated. In another example, the four error signals are signals of different frequency, and the corresponding alarms are LED flashes of different frequencies.

It will be apparent to those skilled in the art that the invention is not limited to the above described embodiments, and that various modification and variations can be made in the circuit interrupter device of the present invention without departing from the spirit or scope of the invention. Thus, it is intended that the present invention cover modifications and variations that come within the scope of the appended claims and their equivalents.

What is claimed is:

1. A circuit interrupter device comprising:
a hot conducting circuit and a neutral conducting circuit for connecting to a power source;
a fault detection circuit, coupled to the hot conducting circuit and the neutral conducting circuit, being responsive to at least a fault in the hot conducting circuit and the neutral conducting circuit to generate a first fault detection signal;
a signal driving circuit, coupled to the fault detection circuit, being responsive to the first fault detection signal to generate a drive signal;
a disconnecting mechanism, coupled to the signal driving circuit, for disconnecting an electrical connection in the hot conducting circuit and the neutral conducting circuit when the drive signal exceeds a predetermined level;
a self-test circuit, coupled to the fault detection circuit and the signal driving circuit, for generating a self-test signal according to a predetermined time period and when an alternating current of the power source passes zero points, generating an evaluation result based on the self-test signal and a feedback signal of a second fault detection signal corresponding to the self-test signal, and generating one or more error signals if the evaluation result indicates a circuit error; and
a device-state indicator circuit, coupled to the self-test circuit, for generating one or more alarms based on the one or more error signals;
wherein the self-test circuit comprises:
a zero-point sampling circuit, coupled to the hot conducting circuit and the neutral conducting circuit, for providing a zero-point sampling signal when the alternating current of the power source passes the zero points; and
a self-test signal processing circuit, coupled to the zero-point sampling circuit and the fault detection circuit, for generating the self-test signal according to the predetermined time period and in response to the zero-point sampling signal, generating the evaluation result in response to the self-test signal and the feedback signal of the second fault detection signal corresponding to the self-test signal, and generating the one or more error signals based on the evaluation result that indicates the circuit error.

2. The circuit interrupter device of claim 1, wherein the signal driving circuit includes a silicon-control rectifier (SCR), a control gate of the SCR being coupled to the fault detection circuit, the SCR being responsive to the fault detection signal to generate the drive signal.

3. The circuit interrupter device of claim 2, wherein the self-test circuit further includes an SCR-state sampling circuit, coupled to the SCR and the self-test signal processing circuit, being responsive to the second fault detection signal corresponding to the self-test signal to generate the feedback signal applied to the self-test signal processing circuit.

4. The circuit interrupter device of claim 3, wherein the SCR-state sampling circuit includes a coupling device, wherein a primary stage of the coupling device is coupled to the SCR and a secondary stage of the coupling device is coupled to the fault detection circuit and the self-test signal processing circuit, the coupling device being responsive to the fault detection signal corresponding to the self-test signal to generate the feedback signal applied to the self-test signal processing circuit.

5. The circuit interrupter device of claim 4, wherein the primary stage of the coupler device is coupled via a resistive path to a DC bias of the signal driving circuit and an anode of the SCR respectively, wherein the resistive path restricts a current through the SCR to a value smaller than a maintenance current of the SCR.

6. The circuit interrupter device of claim 2, further comprising a whole-wave rectifier bridge, wherein the anode of the SCR is connected to the rectifier bridge to receive a DC bias voltage.

7. The circuit interrupter device of claim 1, wherein the fault detection circuit includes an inductor device, wherein a first primary winding of the inductor device is coupled to the hot conducting circuit and the neutral conducting circuit, the inductor device generating the first fault detection signal in response to a fault in the first primary winding, and wherein the inductor device includes a second primary winding coupled to the self-test signal processing circuit, the inductor device generating the second fault detection signal in response to the self-test signal, wherein the self-test signal is a high-frequency pulse signal.

8. The circuit interrupter device of claim 7, wherein the second primary winding of the inductor device has multiple turns.

9. The circuit interrupter device of claim 1, wherein the device-state indicator circuit includes a light-emitting diode or a beeper.

* * * * *